United States Patent
Lin

(10) Patent No.: US 9,902,085 B2
(45) Date of Patent: Feb. 27, 2018

(54) FEEDING MACHINE

(71) Applicant: Chin-Chi Lin, Taichung (TW)

(72) Inventor: Chin-Chi Lin, Taichung (TW)

( * ) Notice: Subject to any disclaimer, the term of this patent is extended or adjusted under 35 U.S.C. 154(b) by 737 days.

(21) Appl. No.: 14/574,433

(22) Filed: Dec. 18, 2014

(65) Prior Publication Data

US 2016/0059435 A1 Mar. 3, 2016

(30) Foreign Application Priority Data

Sep. 2, 2014 (TW) .............................. 103130271 A

(51) Int. Cl.
*B27B 25/02* (2006.01)
*B65G 39/12* (2006.01)
*B65G 13/07* (2006.01)
*B65G 13/04* (2006.01)
*B27C 1/12* (2006.01)
*B23Q 3/00* (2006.01)
*B27B 25/08* (2006.01)
*B23Q 7/05* (2006.01)

(52) U.S. Cl.
CPC .............. *B27B 25/02* (2013.01); *B23Q 3/002* (2013.01); *B23Q 7/055* (2013.01); *B27B 25/08* (2013.01); *B27C 1/12* (2013.01); *B65G 13/04* (2013.01); *B65G 13/07* (2013.01); *B65G 39/12* (2013.01)

(58) Field of Classification Search
CPC ........ B65G 13/04; B65G 13/07; B65G 39/12; B27B 25/02; B27B 25/08; B27C 1/12; B23Q 3/002; B23Q 7/055

USPC .......... 198/782, 781.11, 842, 843, 608, 624; 193/35 B
See application file for complete search history.

(56) References Cited

U.S. PATENT DOCUMENTS

| 4,483,378 | A | * | 11/1984 | Chang | B23Q 5/385 144/136.1 |
| 5,799,854 | A | * | 9/1998 | Lin | B23Q 7/055 144/246.1 |
| 6,016,593 | A | * | 1/2000 | Kyrstein | B27B 25/02 198/615 |
| 8,931,528 | B2 | * | 1/2015 | Hsiung | B27B 25/10 144/242.1 |
| 2009/0101235 | A1 | * | 4/2009 | Lin | B27B 25/02 144/245.1 |
| 2012/0097003 | A1 | * | 4/2012 | Lin | B27B 25/02 83/419 |
| 2014/0360627 | A1 | * | 12/2014 | Sung | B27B 25/02 144/248.4 |

* cited by examiner

*Primary Examiner* — Leslie A Nicholson, III
*Assistant Examiner* — Keith R Campbell
(74) *Attorney, Agent, or Firm* — Trop, Pruner & Hu, P.C.

(57) ABSTRACT

A feeding machine includes: a machine shell having a supporting end and a driving end that is opposite to the supporting end; a feeding unit connected to the machine shell and including a plurality of feeding wheels spaced apart from one another; and a driving unit including a motor that extends into the machine shell and that has an output shaft, and a speed reducing member that is disposed between the motor and the feeding unit and that has a worm and a worm wheel orthogonal to the worm. The worm is disposed in the machine shell and on the output shaft of the motor. The worm wheel is disposed under the worm.

10 Claims, 5 Drawing Sheets

US 9,902,085 B2

FEEDING MACHINE

CROSS-REFERENCE TO RELATED APPLICATION

This application claims priority of Taiwanese Patent Application No. 103130271, filed on Sep. 2, 2014, the entire disclosure of which is hereby incorporated by reference.

FIELD OF THE INVENTION

This invention relates to a feeding machine, and more particularly to a compact feeding machine.

BACKGROUND OF THE INVENTION

A feeding machine is used to feed a workpiece, such as a wood, to allow a planning or cutting operation to be performed on the workpiece.

Referring to FIG. 1, a conventional feeding machine is shown to include a main body 11, a motor 12 that is vertically mounted on the main body 11, and a bracket unit 13 that is connected to the main body 11 and the motor 12. When using the feeding machine, the main body 11 is rotatable relative to the bracket unit 13 so that the workpiece can be fed along different directions. However, the total height (h) of the feeding machine is relatively large so that it is relatively space-consuming and inconvenient to use.

SUMMARY OF THE INVENTION

Therefore, the object of the present invention is to provide a feeding machine that can overcome the aforesaid drawback of the prior art.

According to this invention, a feeding machine includes a machine shell, a feeding unit and a driving unit. The machine shell has a supporting end and a driving end that is opposite to the supporting end along a referential direction. The feeding unit is connected to the machine shell and includes a plurality of feeding wheels spaced apart from one another along the referential direction. Each feeding wheel has a central axis. The central axes of the feeding wheels are parallel to one another. The driving unit includes a motor that extends into the machine shell and that has an output shaft parallel to the referential direction, and a speed reducing member that is disposed between the motor and the feeding unit and that has a worm and a worm wheel orthogonal to the worm. The worm is disposed in the machine shell and on the output shaft of the motor. The worm wheel is disposed under the worm and has a central axis parallel to the central axes of the feeding wheels.

BRIEF DESCRIPTION OF THE DRAWINGS

Other features and advantages of the present invention will become apparent in the following detailed description of the embodiment of this invention, with reference to the accompanying drawings, in which.

DETAILED DESCRIPTION OF THE EMBODIMENT

Figure 1:
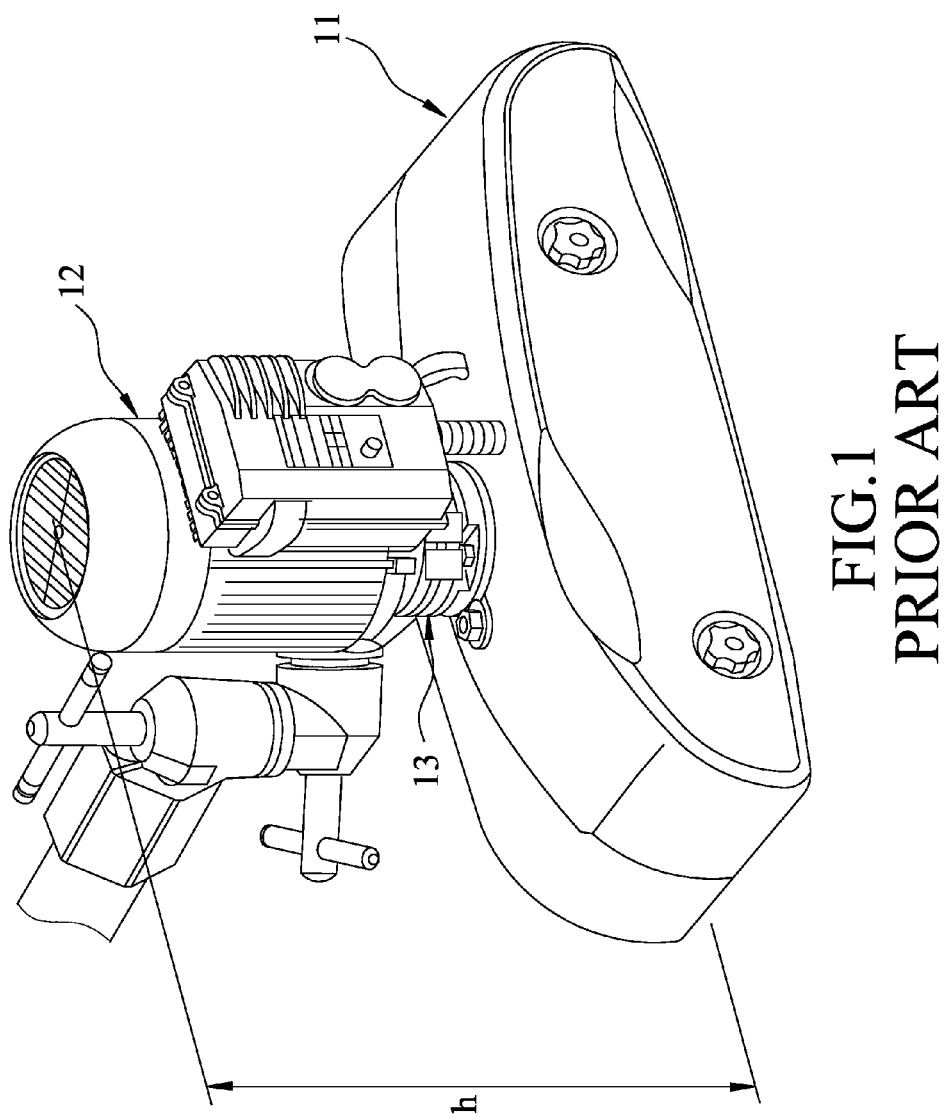
FIG. 1 is a perspective view of a conventional feeding machine.

Referring to FIGS. 2 to 5, the embodiment of a feeding machine according to the present invention is adapted to feed a workpiece (e.g., wood 100) and is shown to include a machine shell 2, a feeding unit 3 and a driving unit 4.

The machine shell 2 includes an outer shell body 21 and an inner partition body 22 disposed in the outer shell body 21. The machine shell 2 has a supporting end 23 and a driving end 24 that is opposite to the supporting end 23 along a referential direction (L), as best shown in FIG. 3.

The outer shell body 21 is indented from the driving end 24 of the machine shell 2 along the referential direction (L) to define a first chamber 201. The outer shell body 21 and the inner partition body 22 cooperatively define a second chamber 202 and a third chamber 203 that are respectively disposed at opposite sides of the inner partition body 22, as best shown in FIG. 4. The inner partition body 22 defines a fourth chamber 204 that is in spatial communication with the first chamber 201. The outer shell body 21 further defines a fifth chamber 205 that is adjacent to the first chamber 201, and a sixth chamber 206 that is formed in a top surface 210 of the outer shell body 21 and that is adjacent to the fifth chamber 205 (see FIG. 5). The inner partition body 22 further defines a lubricant chamber 207 that is in spatial communication with the first chamber 201 and the fourth chamber 204. The machine shell 2 further includes a side cover 25 that is disposed on a lateral side of the outer shell body 21 and that fully covers the second chamber 202 (see FIG. 3). The fourth chamber 204 extends from the second chamber 202 into the third chamber 203 and is formed with an opening 241 that is disposed in the second chamber 202.

Figure 3:
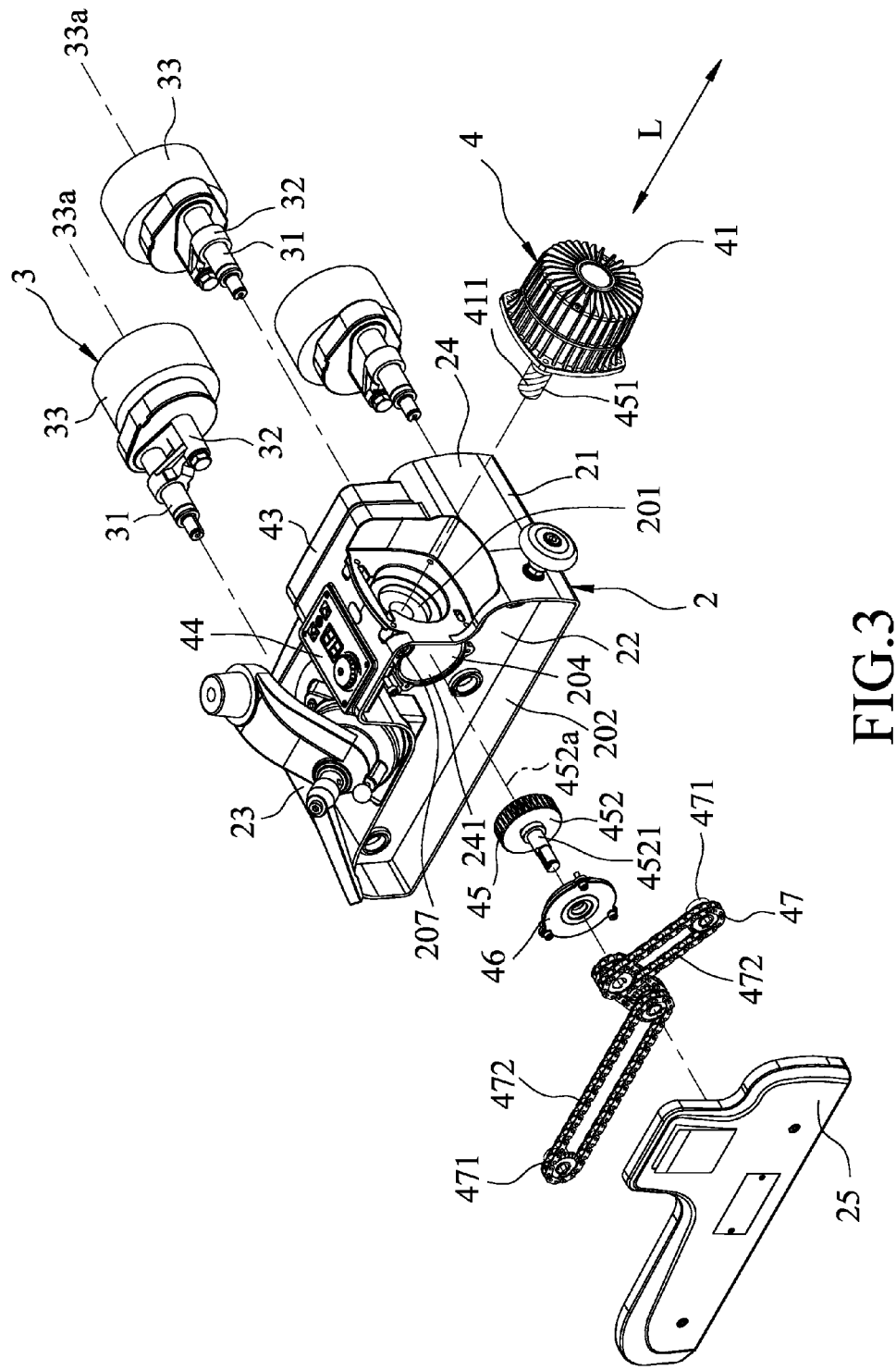
FIG. 3 is an exploded perspective view of the embodiment.
Figure 4:
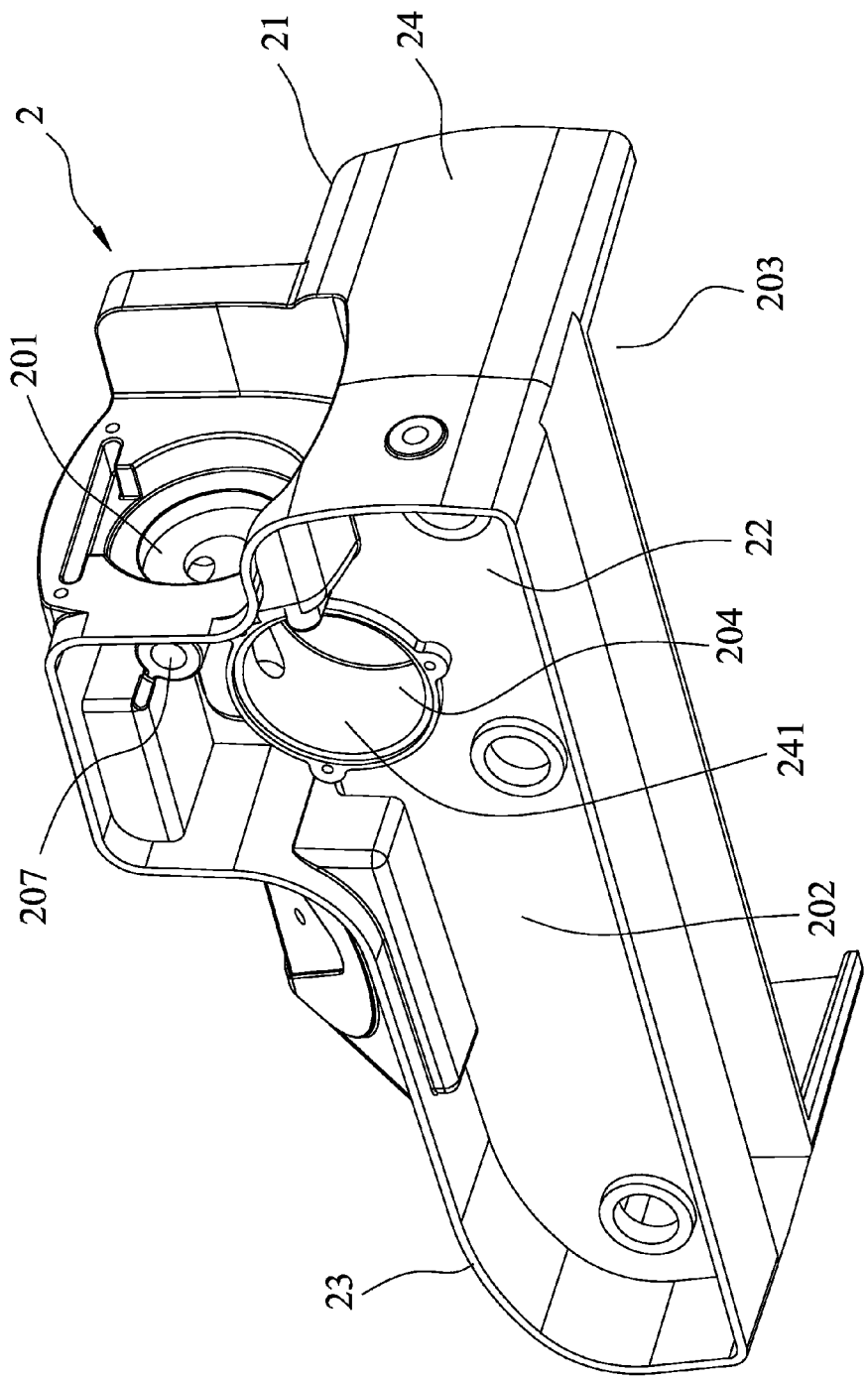
FIG. 4 is a perspective view of a machine shell of the embodiment.
Figure 5:
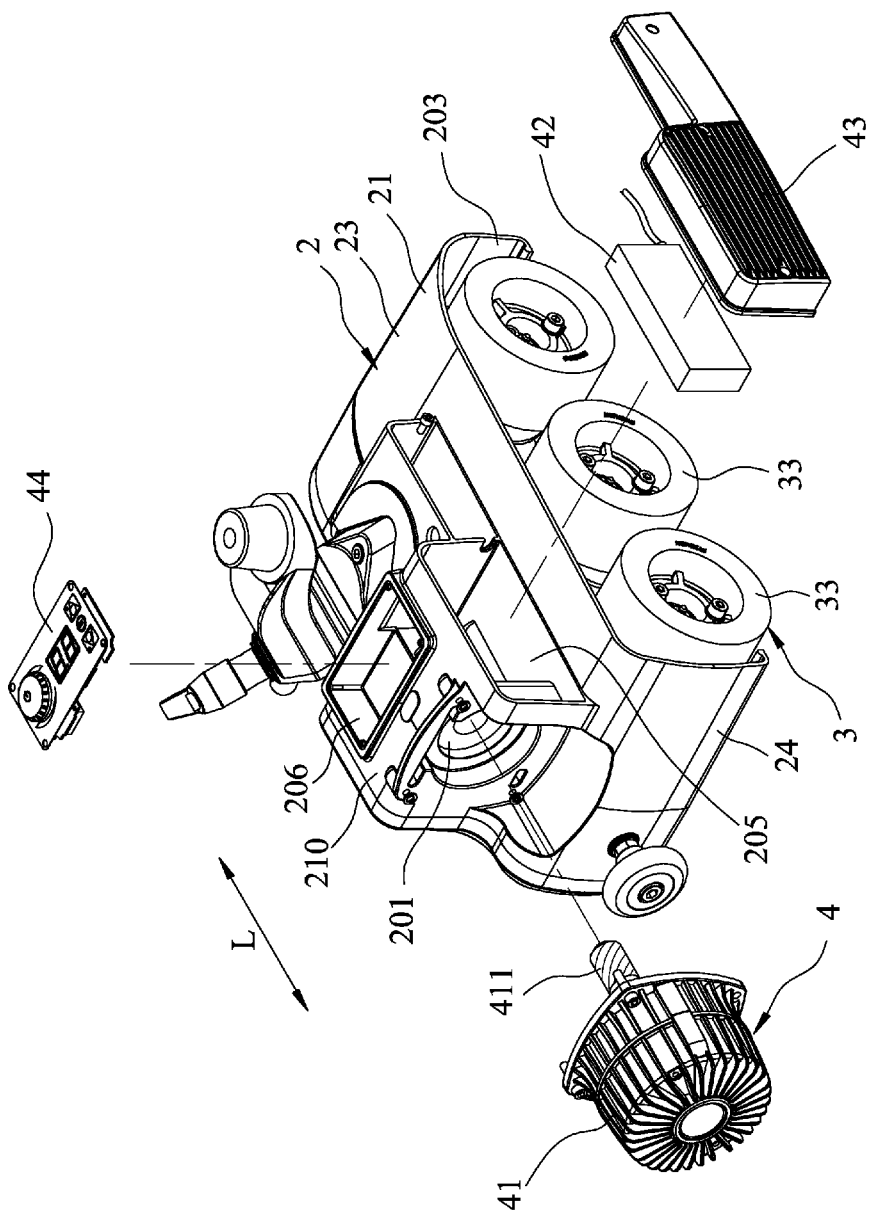
FIG. 5 is a partly assembled perspective view of the embodiment.

Referring to FIGS. 3 and 5, the feeding unit 3 is connected to the machine shell 2 and includes a plurality of pivot shafts 31, a plurality of shock absorbers 32 and a plurality of feeding wheels 33.

The pivot shafts 31 extend through the inner partition body 22 and are configured to respectively and fixedly connect with the feeding wheels 33. Each shock absorber 32 is disposed between the machine shell 2 and a respective one of the feeding wheels 33, and is sleeved fixedly on a respective one of the pivot shafts 31 so that the feeding wheels 33 can be adapted for feeding uneven materials.

The feeding wheels 33 are spaced apart from one another along the referential direction (L) and are received in the third chamber 203. Each feeding wheel 33 has a central axis 33a. The central axes 33a of the feeding wheels 33 are parallel to one another. In this embodiment, the feeding wheels 33 protrude from the machine shell 2. However, it should be noted that the feeding wheels 33 may also be fully received in machine shell 2 in a variation of this embodiment. Moreover, in this embodiment, the number of the pivot shafts 31, the number of the shock absorbers 32, and the number of the feeding wheels 33 are three. However, it should be understood that the numbers of the pivot shafts 31, the shock absorbers 32, and the feeding wheels 33 are not limited to three and may vary depending on actual requirements. In a variation, the feeding unit 3 may only have one pivot shaft 31, one shock absorber 32 and one feeding wheel 33.

The driving unit 4 includes a motor 41, a motor control module 42 (see FIG. 5), a heat dissipating member 43, an operating panel 44, a speed reducing member 45, an oil seal bearing 46 and a transmission set 47.

The motor 41 extends into the machine shell 2 and has an output shaft 411 parallel to the referential direction (L). The first chamber 201 receives the motor 41 therein. In this embodiment, the motor 41 is, for example but not limited to, a direct current variable frequency motor.

The motor control module 42 is received in the fifth chamber 205 and is used to drive the motor 41.

The heat dissipating member 43 is adjacent to the motor control module 42 and protrudes from the fifth chamber 205 to permit heat exchange between the motor 41 and an external environment. In this embodiment, the heat dissipating member 43 is, for example but not limited to, a cooling fin.

The operating panel 44 is received in the sixth chamber 206 and is electrically connected to the motor control module 42. To be more specific, the rotating speed of the motor 41 can be controlled and manipulated using the operating panel 44.

The speed reducing member 45 is disposed between the motor 41 and the feeding unit 3 and has a worm 451 and a worm wheel 452 orthogonal to the worm 451.

The worm 451 is disposed in the machine shell 2 and on the output shaft 411 of the motor 41. To be more specific, the worm 451 is disposed in the first chamber 201 along the referential direction (L).

The worm wheel 452 is received in the fourth chamber 204, is disposed under the worm 451 and has a central axis 452a parallel to the central axes 33a of the feeding wheels 33, and has an axle portion 4521. In this embodiment, the output shaft 411 of the motor 41 and the worm 451 of the speed reducing member 45 are formed as one piece. However, it is worth noting that the output shaft 411 and the worm 451 could also be manufactured separately and then be assembled together.

The oil seal bearing 46 is sleeved on the axle portion 4521 of the worm wheel 452 and sealingly covers the opening 241 of the fourth chamber 204. In this embodiment, lubricating oil could be filled into the lubricant chamber 207 so as to lubricate the worm 451, the output shaft 411 of the motor 41, and the worm wheel 452.

The transmission set 47 is connected between the speed reducing member 45 and the feeding unit 3, is received in the second chamber 202, and is configured to transmit power from the motor 41 to the feeding wheels 33. The transmission set 47 includes a plurality of sprockets 471 that are disposed on the worm wheel 452 and the pivot shafts 31, and a plurality of chains 472 that interconnect the sprockets 471. To be more specific, each pivot shaft 31 has two opposite ends respectively connected to a respective one of the feeding wheels 33 and the transmission set 47.

Figure 2:
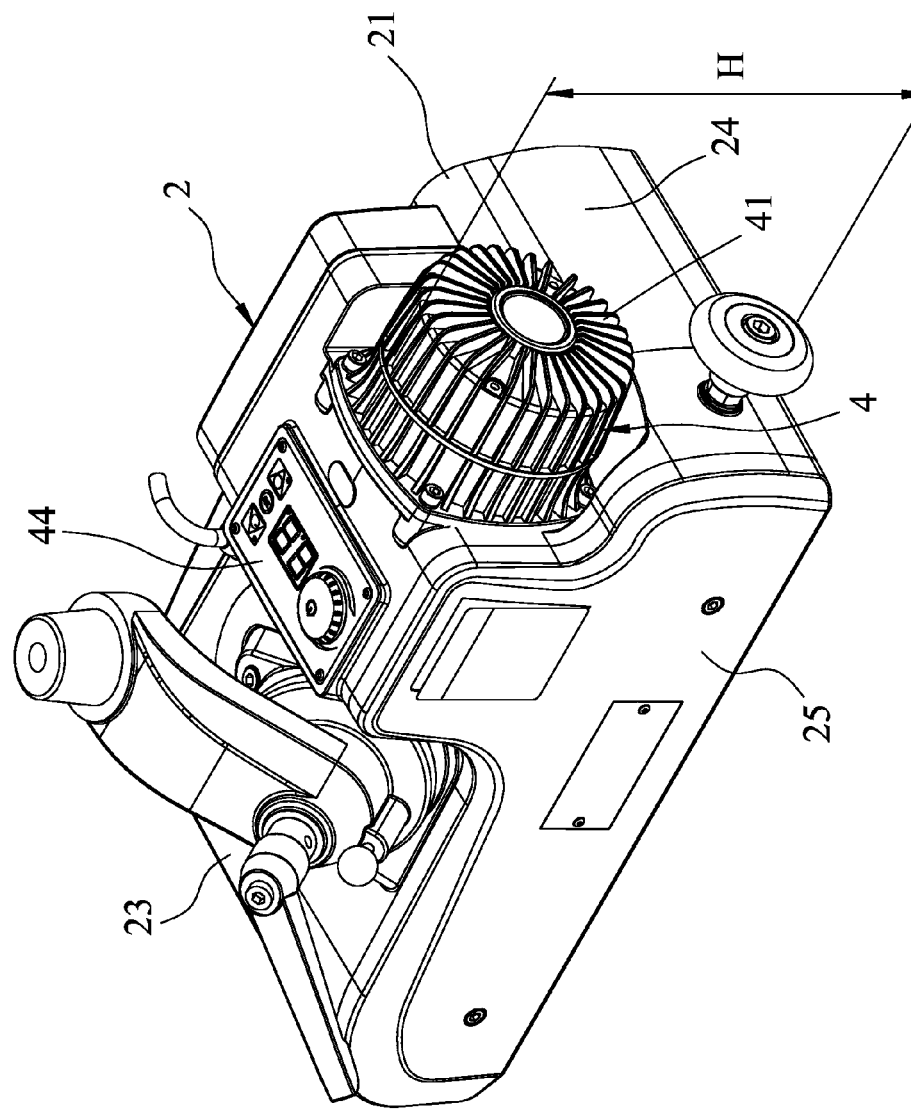
FIG. 2 is an assembled perspective view of the embodiment of a feeding machine according to the present invention.

Referring to FIG. 2, the total height (H) of the feeding machine according to the present invention is defined from lower ends of the feeding wheels 33 to an upper end of the machine shell 2.

By virtue of the above-mentioned configuration of the machine shell 2, the feeding machine of this disclosure is advantageous for the following reasons:

(1) By virtue of a compact arrangement among the first to sixth chambers 201~206, the total height (H) of the feeding machine could be smaller than that of the above-mentioned conventional feeding machine, thereby increasing convenience and safety when using.

(2) Moreover, by the compact arrangement among the first to sixth chambers 201~206, the total volume of the feeding machine is decreased, thereby reducing the manufacturing cost. Furthermore, since the total volume is decreased, the heat dissipating element 43 can perform an excellent heat dissipating efficiency, thereby prolonging the service life of the feeding machine.

(3) By virtue of the lubricant chamber 207, when filling the lubricating oil into the lubricant chamber 207, the friction between the worm 451 and the worm wheel 452 is reduced, thereby enhancing transmission efficiency. Furthermore, the oil seal bearing 46 could prevent leakage of the lubricating oil so that the feeding machine is more eco-friendly and is safe to use.

While the present invention has been described in connection with what is considered the most practical embodiment, it is understood that this invention is not limited to the disclosed embodiment but is intended to cover various arrangements included within the spirit and scope of the broadest interpretation and equivalent arrangements.

What is claimed is:

1. A feeding machine, comprising:
a machine shell having a supporting end and a driving end that is opposite to said supporting end along a referential direction;
a feeding unit connected to said machine shell and including a plurality of feeding wheels spaced apart from one another along the referential direction and each having a central axis, said central axes of said feeding wheels being parallel to one another; and
a driving unit including a motor that extends into said machine shell and that has an output shaft parallel to the referential direction, and a speed reducing member that is disposed between said motor and said feeding unit and that has a worm and a worm wheel orthogonal to said worm, said worm being disposed in said machine shell along the referential direction and on the output shaft of said motor, said worm wheel being disposed under said worm and having a central axis parallel to said central axes of said feeding wheels.

2. The feeding machine as claimed in claim 1, wherein said driving unit further includes a transmission set that is connected between said speed reducing member and said feeding unit and that is configured to transmit power from said motor to said feeding wheels.

3. The feeding machine as claimed in claim 2, wherein said feeding unit further includes a plurality of pivot shafts, said transmission set including a plurality of sprockets that are disposed on said worm wheel and said pivot shafts, and a plurality of chains that interconnect said sprockets.

4. The feeding machine as claimed in claim 1, wherein said machine shell includes an outer shell body and an inner partition body disposed in said outer shell body, said outer shell body being indented from said driving end of said machine shell along the referential direction to define a first chamber that receives said motor therein.

5. The feeding machine as claimed in claim 4, wherein said outer shell body and said inner partition body cooperatively define a second chamber and a third chamber that are respectively disposed at opposite sides of said inner partition body, said transmission set of said driving unit being received in said second chamber, said feeding wheels of said feeding unit being received in said third chamber, said pivot shafts of said feeding unit extending through said inner partition body, each of said pivot shafts having two opposite ends respectively connected to a respective one of said feeding wheels and said transmission set.

6. The feeding machine as claimed in claim 4, wherein said inner partition body defines a fourth chamber that is in spatial communication with said first chamber, said worm wheel of said speed reducing member being received in said fourth chamber.

7. The feeding machine as claimed in claim 6, wherein said inner partition body further defines a lubricant chamber that is in spatial communication with said first chamber and said fourth chamber, said worm wheel having an axle portion, said driving unit further including an oil seal bearing that is sleeved on said axle portion of said worm wheel and that sealingly covers said fourth chamber.

8. The feeding machine as claimed in claim 4, wherein said outer shell body further defines a fifth chamber that is adjacent to said first chamber, said driving unit further including a motor control module that is received in said fifth chamber and that is used to drive said motor.

9. The feeding machine as claimed in claim 8, wherein said outer shell body further defines a sixth chamber that is formed in a top surface of said outer shell body and that is adjacent to said fifth chamber, said driving unit further including an operating panel that is received in said sixth chamber and that is electrically connected to said motor control module.

10. The feeding machine as claimed in claim 1, wherein said feeding further includes a plurality of shock absorbers each disposed between said machine shell and a respective one of said feeding wheels.

\* \* \* \* \*